UNITED STATES PATENT OFFICE.

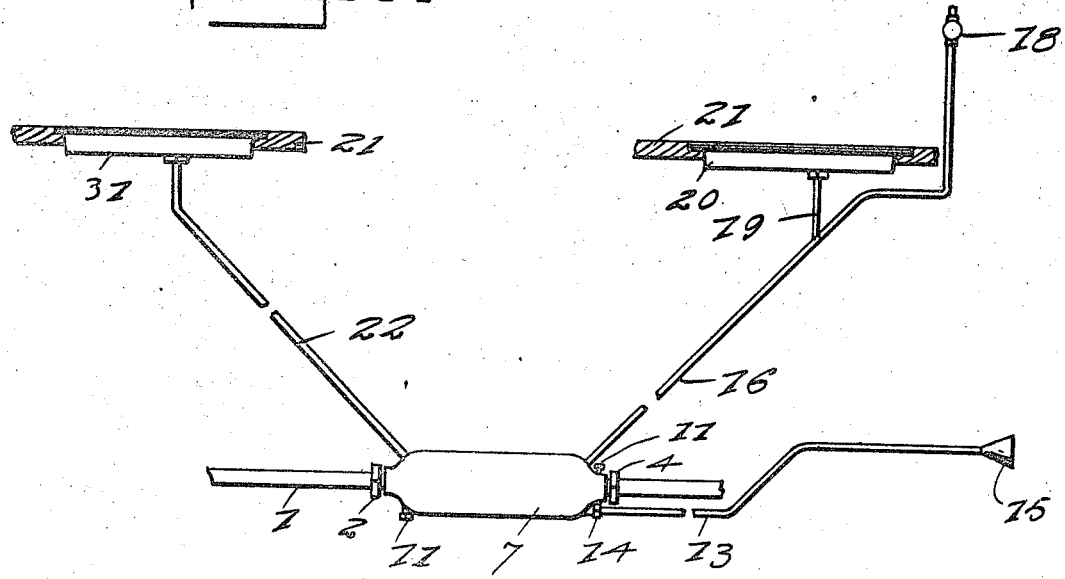
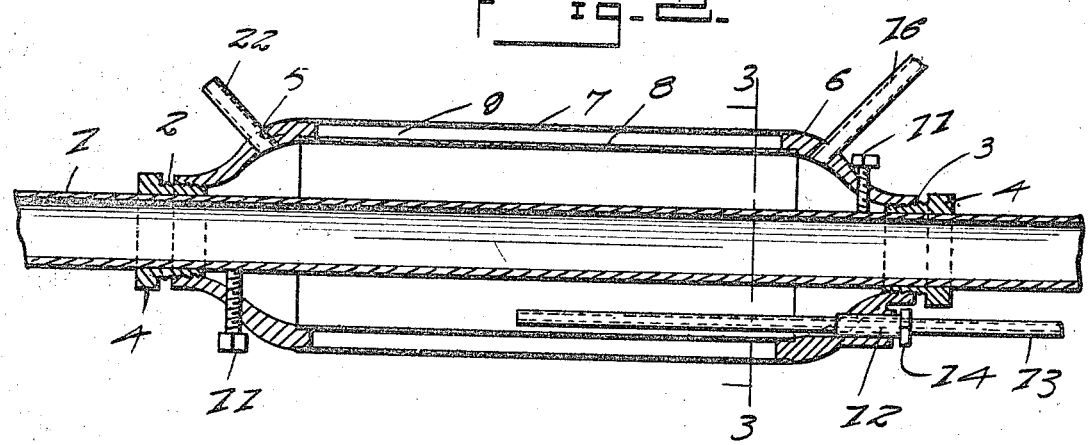
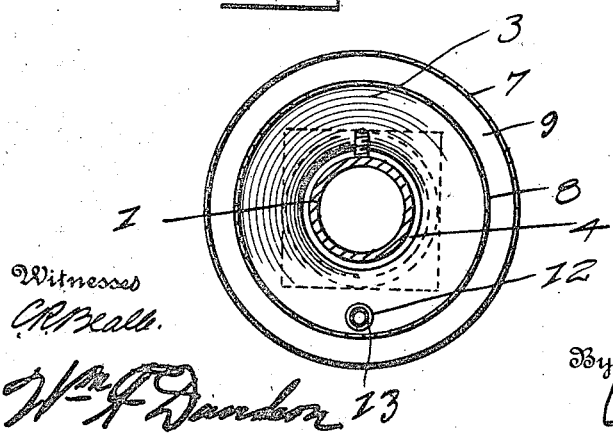

JOHN J. REDKEY, OF PUEBLO, COLORADO.

AUTOMOBILE-HEATER.

1,217,064. Specification of Letters Patent. Patented Feb. 20, 1917.

Application filed July 25, 1916. Serial No. 111,254.

*To all whom it may concern:*

Be it known that I, JOHN J. REDKEY, a citizen of the United States, residing at Pueblo, in the county of Pueblo and State of Colorado, have invented certain new and useful Improvements in Automobile-Heaters; and I do hereby declare the following to be a full, clear, and exact description of the invention, such as will enable others skilled in the art to which it appertains to make and use the same.

This invention relates to an automobile heater and has for its primary object the provision of means for accumulating air around the exhaust pipe of the engine of the automobile so that the air will become heated and later conducted to various places within the automobile to warm the occupants.

Another object of this invention is to provide a heating drum mounted upon the exhaust pipe of the engine and having an air intake pipe to furnish the drum with air which becomes heated by the exhaust pipe and passes through outlet pipes to various points of the automobile for heating purposes.

A further object of this invention is to provide a radiator located within the floor of the automobile and connected with the heating drum to receive hot air therefrom and having means for controlling the inlet of hot air into the radiator, whereby the heat from the radiator may be regulated.

A further object of this invention is the provision of means for connecting the steering wheel of the automobile with the drum, whereby the steering wheel may be heated to keep the operator's hands warm, obviating the danger of accidents caused by operator's hands becoming cold and unable to properly steer the automobile.

A further object of this invention is to provide a foot railing connected to the drum, whereby the foot railing may be heated to keep the feet of the occupants of the automobile warm.

A still further object of this invention is the provision of an automobile heater of the above stated character, which shall be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which:—

Figure 1 is a side elevation of an automobile heater, constructed in accordance with my invention, Fig. 2 is a vertical sectional view of the heating drum, illustrating the means of securing it to the exhaust pipe, and Fig. 3 is a sectional view taken on the line 3—3 of Fig. 2.

Referring in detail to the drawings, the numeral 1 indicates the exhaust pipe of an engine of an automobile having mounted thereon a pair of externally screw-threaded collars 2 and 3, each having squared portions 4 to be engaged by a wrench for turning the collars upon the exhaust pipe 1. Substantially funnel-shaped heads 5 and 6 are threaded to the collars 2 and 3 upon the exhaust pipe 1. A pair of cylindrical casings 7 and 8 are carried by the heads 5 and 6 as clearly illustrated in Fig. 2 and are spaced apart to form a dead air space 9. Set screws 11 are carried by the heads 5 and 6 for an engagement with the exhaust pipe 1 for securing the heads against lateral movement upon the exhaust pipe to prevent the casings 7 and 8 from becoming detached from the heads. The head 6 has an opening at a point below the exhaust pipe 1 to receive a threaded collar 12 which is mounted upon an air intake pipe 13. The collar 12 has an enlarged squared portion 14 for the reception of a wrench for turning the collar within the opening 12 of the head 6. The air intake pipe 13 extends forwardly from the head 6 to a point adjacent the fan mounted upon the engine of the automobile (not shown) and has its end of substantially funnel shape as illustrated at 15 so that air drawn in by the fan of the automobile engine will pass into the pipe 13 and into the space occurring between the casing 8 and the exhaust pipe 1, whereby the heat from the exhaust pipe will efficiently heat air entering from the air intake pipe 13. An outlet pipe 16 is connected to the head 6 at a point above the exhaust pipe 1 and extends upwardly to a point adjacent the dash of the automobile (not shown) and has mounted upon its upper end a valve 18. A branch pipe 19 is connected to the outlet pipe 16 for conducting the heated air to a radiator 20 located within the floor board 21 of the automobile. The radiator 20 being located in the flooring between the dash of the automobile and the front seat. An outlet pipe 22 is connected to the head 5 at a point above the exhaust pipe and extends upwardly and is connected to a radiator similar to the radiator 20 and which is mounted within the flooring of the automobile between the rear seat and the front seat for heating the occupants occupying the rear seat of the automobile. The valve 18 is connected to flexible tubes not shown, which are in turn connected to a foot railing and to a steering wheel (not shown).

While I have shown and described the preferred embodiment of my invention, it will be understood that minor changes in construction, combination and arrangement of parts may be made without departing from the spirit and scope of the invention as claimed.

Having thus described my invention, what I claim is:—

The combination with an exhaust pipe of an engine, of relatively spaced and externally screwthreaded collars mounted on the exhaust pipe, substantially funnel shaped heads mounted on the exhaust pipe and having their restricted portions threaded to the collars, set screws threaded to the heads and engaging the exhaust pipe to prevent the collars and heads from moving on the exhaust pipe, a pair of cylindrical casings carried by the heads and surrounding the exhaust pipe to form a heating chamber, said casings being relatively spaced on the heads to form a dead air chamber, means for admitting air to the heating chamber, and an outlet pipe connected to the heads for receiving heated air from the heating chamber.

In testimony whereof I affix my signature in presence of two witnesses.

JOHN J. REDKEY.

Witnesses:
 FLORENCE A. BARTELS,
 ANNA CLOUGH.